United States Patent
Wu

(10) Patent No.: US 9,473,488 B2
(45) Date of Patent: Oct. 18, 2016

(54) CONTROL DEVICE AND METHOD FOR ELECTRONIC ATOMIZATION DEVICE BASED ON MOBILE TERMINAL

(71) Applicant: SHENZHEN JIESHIBO TECHNOLOGY CO., LTD., Shenzhen, Guangdong (CN)

(72) Inventor: Jianyong Wu, Shenzhen (CN)

(73) Assignee: SHENZHEN JIESHIBO TECHNOLOGY CO., LTD., Shenzhen (CN)

( * ) Notice: Subject to any disclaimer, the term of this patent is extended or adjusted under 35 U.S.C. 154(b) by 90 days.

(21) Appl. No.: 14/404,010

(22) PCT Filed: Aug. 15, 2014

(86) PCT No.: PCT/CN2014/084518
§ 371 (c)(1),
(2) Date: Nov. 26, 2014

(87) PCT Pub. No.: WO2016/023225
PCT Pub. Date: Feb. 18, 2016

(65) Prior Publication Data
US 2016/0050196 A1   Feb. 18, 2016

(51) Int. Cl.
| H04L 29/06 | (2006.01) |
| G06F 17/30 | (2006.01) |
| H04W 12/06 | (2009.01) |
| H04W 4/00 | (2009.01) |
| H04W 88/02 | (2009.01) |

(52) U.S. Cl.
CPC ....... *H04L 63/083* (2013.01); *G06F 17/30876* (2013.01); *H04W 12/06* (2013.01); *H04L 63/0861* (2013.01); *H04W 4/008* (2013.01); *H04W 88/02* (2013.01)

(58) Field of Classification Search
USPC ........................................................ 455/418
See application file for complete search history.

(56) References Cited

U.S. PATENT DOCUMENTS

2006/0219776 A1* 10/2006 Finn ................. B60R 25/25
                                                        235/380
2011/0103586 A1*  5/2011 Nobre ............... H04L 63/0853
                                                        380/270

* cited by examiner

*Primary Examiner* — Jason Lee

(57) ABSTRACT

Disclosed are a control device and a control method for electronic atomization device based on mobile terminal. The device includes a Bluetooth control module, a matching module and an authentication module. The control method includes steps of: building a Bluetooth connection between battery and mobile terminal; sending atomizer identification information stored in atomizer to the mobile terminal and then carrying out a match by comparing the atomizer identification information and original identification information; and searching corresponding user identification information according to serial number of the battery, receiving authentication information entered by user and then carrying out an authentication by comparing the authentication information entered by user and the user identification information. By using authentication device and powerful computing ability of the mobile terminal directly, both of authentication for the electronic atomization device and match between the battery of electronic atomization device and atomizer can be achieved on the mobile terminal.

24 Claims, 2 Drawing Sheets

CONTROL DEVICE AND METHOD FOR ELECTRONIC ATOMIZATION DEVICE BASED ON MOBILE TERMINAL

FIELD OF THE INVENTION

The present invention relates to electronic atomization device and, in particular, it concerns a control device and method for electronic atomization device based on mobile terminal.

BACKGROUND OF THE INVENTION

Electronic atomization device, also called electronic cigarette, atomization tobacco with low temperature, is mainly used for reducing harm brought by smoking traditional cigarette. Its appearance and taste is similar to cigarette and it has more flavors than even normal cigarette do. It also can create a cloud, a taste and a feel that resembles cigarette. The electronic atomization device, which is composed of battery assembly and atomizer, is an imitative cigarette, and flavor components therein can be atomized into gas by atomization so that user can inhale it directly. The flavor components includes tobacco liquid, tobacco shred, tobacco powder, tobacco paste, fragrant slice, fragrant bar, liquid tobacco and so on.

Generally, electronic atomization device does not have a function of preventing being used by other people except the user itself, thus, it is easy to be used by some minors around the user, which brings an adverse effect on body and thought of the minors.

Some electronic atomization devices have a higher-cost authentication device to identify the identity of user, so as to prevent other people except the user itself from using the electronic atomization devices. The authentication device can be a password inputting unit or a fingerprint reader and also can be a device with function of face recognition, pupil recognition or voice recognition and so on. However, the biggest problem with such electronic atomization device is that it has high cost because of: so many components need to be mounted into the electronic atomization device which has not big size originally, and the size of electronic atomization device needs be controlled to be not too big, thus, both of the costs of components and installation cost are not low.

For the electronic atomization device, after being used for some time, its atomizer needs to be replaced with a new one, so as to prevent generation of the carbon deposition and hazardous substance. There are appeared more and more counterfeit atomizers on the market and it is difficult to distinguish the true one from the counterfeit ones for consumers. When consumer needs to change a atomizer but he/she buys a counterfeit one, it will not only damage the benefit of the consumer itself, but also have bad effect on brand reputation for the manufacturer of the atomizer.

In order to make the counterfeit atomizer cannot match the authentic battery, some manufacturers provide functions of recognition and match between the atomizer and battery. Some electronic cigarettes are provided with identification information stored in their atomizers and the identification information will be sent to the battery by the atomizer and then identification and match processing will be carried out directly by the battery. These electronic atomization devices have a problem that both of the atomizer and battery thereof have higher costs. Thus, it is disadvantageous for market promotion of the electronic atomization device.

If adding an authentication device into the electronic atomization device itself and achieving functions of recognition and match of atomizer in the electronic atomization device at the same time, it is hard to control the cost of the whole electronic atomization device, thus it is difficult to reduce its price and it will seriously influence market promotion of the electronic atomization devices.

SUMMARY OF THE INVENTION

An object of the present invention is to overcome the defects of the prior art by providing a control device and method for electronic atomization device based on mobile terminal, which can achieve functions of match and authentication of the electronic atomization device at a lower cost.

To achieve the above object, there are provided following technical solutions:

An control device for electronic atomization device based on mobile terminal, which includes following modules:

A Bluetooth control module, provided for building a Bluetooth connection between battery and mobile terminal;

A matching module, provided for sending atomizer identification information stored in atomizer to the mobile terminal and then carrying out a match by comparing the atomizer identification information and original identification information; and An authentication module, provided for searching corresponding user identification information according to serial number of the battery, receiving authentication information entered by user and then carrying out an authentication by comparing the authentication information entered by user and the user identification information.

Preferably, the matching module includes following units:

An information reading unit, provided for controlling the battery to read identification information of identification chip of the atomizer;

An information transmission unit, provided for sending the identification information to the mobile terminal via Bluetooth; and A comparing and matching unit, provided for carrying out a match by comparing the identification information and original identification information.

Preferably, the matching module further includes following unit:

A match warning unit, provided for giving user a warning that the match is unsuccessful when failing to match.

Preferably, the comparing and matching unit is provided for firstly carrying out a match by comparing the identification information and the original identification information stored in memory of the mobile terminal, and then carrying out a match by comparing the identification information and the original identification information stored in cloud server if the match is unsuccessful.

Preferably, the authentication module includes following units:

An information transmission unit, provided for sending the serial number of the battery to the mobile terminal after the atomizer connects with the battery successfully;

An information searching unit, provided for searching corresponding user identification information according to the serial number of the battery;

An information input unit, provided for receiving the authentication information entered by user; and A comparing and authenticating unit, provided for carrying out an authentication by comparing the authentication information entered by user and the user identification information.

Preferably, the authentication module further includes following unit:

An initialization unit, provided for receiving and storing original user identification information when no user identification information has been stored.

Preferably, the initialization unit is further used for sending the original user identification information to cloud server as a backup.

Preferably, the initialization unit is further used for receiving user identity information entered by user and sending the user identity information to citizen database of corresponding nation, so as to verify the identity of user.

Preferably, the authentication module further includes an authentication control unit, which is provided for controlling the battery to wait for use instruction from user so as to supply power to the atomizer when the authentication is successful.

Preferably, the authentication module further includes an authentication warning unit, which is provided for giving user a warning that the authentication is unsuccessful and controlling the battery not to supply power to the atomizer when the authentication is unsuccessful.

Preferably, the authentication information is biometric identification information or character password information, the user identification information having the same type as the authentication information.

Preferably, the device further includes an information storage module, which is provided for collecting and storing use information of the atomizer after the authentication is successful.

Preferably, the use information of the atomizer is simultaneously stored into the mobile terminal and cloud server by the information storage module.

Furthermore, there is provided a control method for electronic atomization device based on mobile terminal, which includes following steps:

S1: building a Bluetooth connection between battery and mobile terminal;

S2: sending atomizer identification information stored in atomizer to the mobile terminal and then carrying out a match by comparing the atomizer identification information and original identification information; and S3: searching corresponding user identification information according to serial number of the battery, receiving authentication information entered by user and then carrying out an authentication by comparing the authentication information entered by user and the user identification information.

Preferably, the step S2 includes following steps:

S2.1: reading identification information of identification chip of the atomizer via the battery;

S2.2: sending the identification information to the mobile terminal via Bluetooth; and S2.3: carrying out a match by comparing the identification information and original identification information.

Preferably, the step S2.3 includes a step of giving user a warning that the match is unsuccessful when failing to match.

Preferably, the step S2.3 includes steps of: firstly carrying out a match by comparing the identification information and the original identification information stored in memory of the mobile terminal, if the match is unsuccessful, carrying out a match by comparing the identification information and the original identification information stored in cloud server.

Preferably, the step S3 includes following steps:

S3.1: sending the serial number of the battery to the mobile terminal;

S3.2: searching corresponding user identification information according to the serial number of the battery;

S3.3: the mobile terminal receiving the authentication information entered by user; and S3.4: carrying out an authentication by comparing the authentication information entered by user and the user identification information.

Preferably, between the step S3.2 and step S3.3 there is further provided a following step:

S3.2.1: receiving and storing original user identification information when no user identification information has been stored and then returning to the step S3.2.

Preferably, the step S3.2.1 includes a step of: sending the original user identification information to cloud server as a backup.

Preferably, the step S3.2.1 includes a step of: receiving user identity information entered by user and sending the user identity information to citizen database of corresponding nation, so as to verify the identity of user.

Preferably, the step S3.4 includes a step of: controlling the battery to wait for use instruction from user so as to supply power to the atomizer when the authentication is successful.

Preferably, the step S3.4 includes a step of: giving user a warning that the authentication is unsuccessful and controlling the battery not to supply power to the atomizer when the authentication is unsuccessful.

Preferably, the authentication information is biometric identification information or character password information, the user identification information having the same type as the authentication information.

Preferably, the control method further includes follow step after step S3:

S4: collecting and storing use information of the atomizer.

Preferably, the step S4 includes a step of storing use information of the atomizer into the mobile terminal and cloud server simultaneously.

Compared with the prior art, the present invention has beneficial effects as follows:

As disclosed in the present invention, electronic atomization device is connected with mobile terminal via Bluetooth, by means of authentication device and powerful computing ability of the mobile terminal, both of authentication for the electronic atomization device and match between the battery of electronic atomization device and atomizer can be achieved on the mobile terminal, thereby adding functionality to the electronic atomization device and reducing manufacturing cost of the electronic atomization device, and it is advantageous for market promotion of this kind of electronic atomization device.

DETAILED DESCRIPTION OF ILLUSTRATED EMBODIMENTS

For understanding the technical content of the present invention more sufficiently, now combine specific embodiments to introduce and illustrate the technical solution of the present invention as follows.

The First Embodiment

Figure 1:
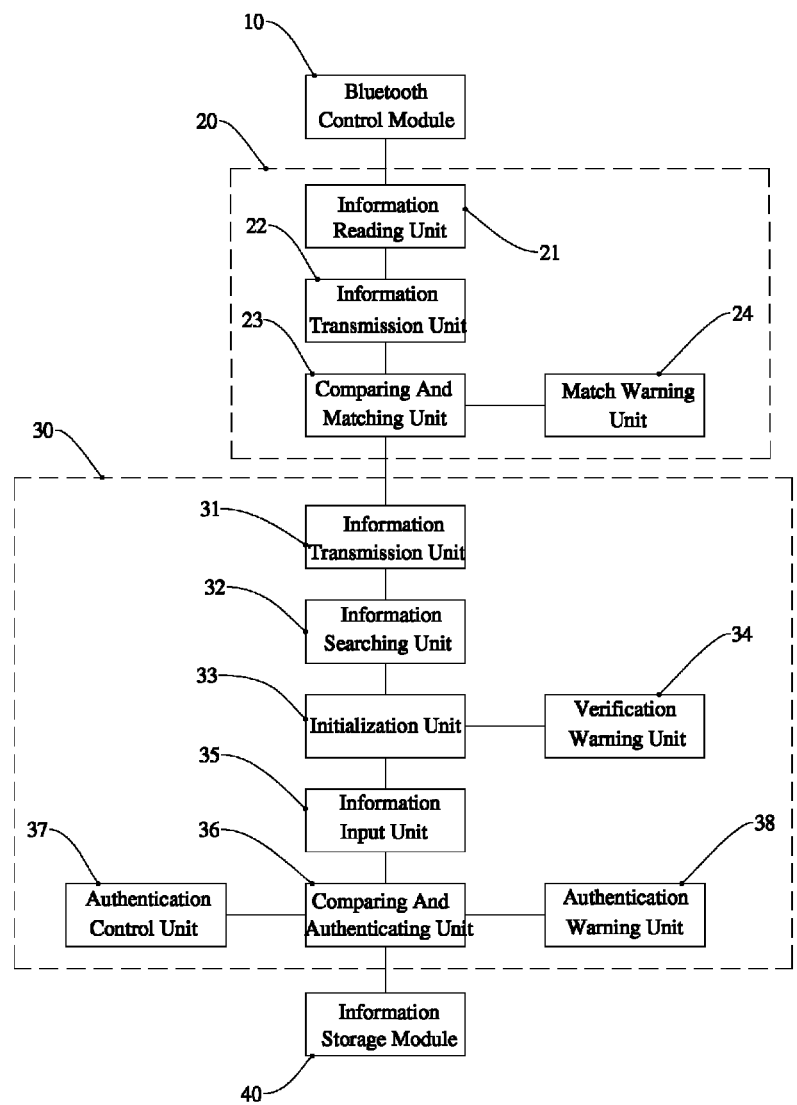
FIG. 1 is a system block diagram of a control device according to the present invention.

The control device for electronic atomization device based on mobile terminal, of which a system block diagram is shown in FIG. 1, includes following modules:

A Bluetooth control module 10, is provided for building a Bluetooth connection between battery and mobile terminal, the Bluetooth control module 10 firstly making the Bluetooth of the mobile terminal open, and then searching Bluetooth signal of the battery and trying to connect with the battery.

A matching module, is provided for sending atomizer identification information stored in atomizer to the mobile terminal and then carrying out a match by comparing the atomizer identification information and original identification information.

An authentication module, is provided for searching corresponding user identification information according to serial number of the battery, receiving authentication information entered by user and then carrying out an authentication by comparing the authentication information entered by user and the user identification information.

The matching module 20 includes following units:

An information reading unit 21, is provided for controlling the battery to read identification information of identification chip of the atomizer. The identification chip is provided within the atomizer when the atomizer is delivered and the identification chip can be a common ID chip. The identification chip of each atomizer has a serial number, which is uniquely corresponding to one atomizer, thus, such a serial number is the identification information of the identification chip. In other embodiments, the identification chip can be replaced by a memory chip and a unique serial number is written into the memory chip; and the memory chip can be a re-writable memory chip and also can be a write-once memory chip.

An information transmission unit 22, is provided for sending the identification information to the mobile terminal via Bluetooth. After the battery reads the identification information successfully, the information transmission unit 22 controls the battery to send the identification information to the mobile terminal via Bluetooth.

A comparing and matching unit 23, is provided for carrying out a match by comparing the atomizer identification information and original identification information. After the mobile terminal receives the identification information, the comparing and matching unit 23 carries out a match by comparing the atomizer identification information and original identification information with the purpose of testing whether the atomizer is an original factory product. The comparing and matching unit 23 firstly carries out a match by comparing the atomizer identification information and the original identification information stored in the memory of the mobile terminal, and if the match is not a success, then carries out a match by comparing the identification information and the original identification information stored in cloud server.

A match warning unit 24, is provided for giving a warning to user that the match is unsuccessful when failing to match. If failing to match, the match warning unit 24 will give a warning to user that the match is unsuccessful and send an instruction of match failure to the battery, and the battery will not supply power to the atomizer after receiving the instruction of match failure. On this condition, no matter the user how to operate the atomizer, the atomizer receives no power supply from the battery, thus the atomizer cannot work. The warning given to user that the authentication is unsuccessful can be achieved in many ways, such as by sending an instruction to make the battery twinkle, providing pop-up dialogs on the mobile terminal and making the screen blink and so on.

The authentication module 30 includes following units:

An information transmission unit 31, is provided for sending the serial number of the battery to the mobile terminal. The information transmission unit controls the battery to send the serial number of battery to the mobile terminal via Bluetooth. The serial number of battery is a serial number of Bluetooth chip itself, which is uniquely corresponding to this Bluetooth chip, thus it also uniquely corresponds to this battery.

An information searching unit 32, is provided for searching corresponding user identification information according to the serial number of the battery. In order to save cost, the user identification information is stored in the mobile terminal or cloud server instead of the battery. The user identification information is bound with the serial number of battery and stored both in the mobile terminal and the cloud server. After the mobile terminal receives the serial number from the battery, the information searching unit 32 starts to search corresponding user identification information in the mobile terminal. If no user identification information can be found in the mobile terminal, the information searching unit 32 will try to search it in the cloud server; and if no corresponding user identification information can be found in either the mobile terminal or the cloud server, the user identification information is blank.

An information input unit 35, is provided for receiving the authentication information entered by user. After the mobile terminal receives the user identification information from the battery via Bluetooth, if the user identification information is not blank, the information input unit 35 will receive the authentication information entered by user.

A comparing and authenticating unit 36, is provided for carrying out an authentication by comparing the authentication information entered by user and the user identification information. After the user enters the authentication information, the comparing and authenticating unit 36 will compare the authentication information and the user identification information from the battery, and if they are the same, the authentication is successful.

The authentication module 30 further includes following units:

An initialization unit 33, is provided for receiving and storing original user identification information when no user identification information has been stored. The initialization unit 33 starts to work after the mobile terminal searches user identification information, the initialization unit 33 confirms whether the user identification information corresponding to the serial number of battery is blank, if it is blank, it means that the electronic atomization device is used for the first time, thus, the user needs to enter initial user identification information. After the initial user identification information being entered by user, the initialization unit 33 will store the initial user identification information into the mobile terminal and make it be bound with the serial number of battery so as to facilitate next searching.

The initialization unit 33 is further used for sending the original user identification information to cloud server as a backup. After the initial user identification information being entered by user, the initialization unit 33 will send the initial user identification information to cloud server via wireless module of mobile terminal so as to back up the initial user identification information, thus, the user can directly find the initial user identification information in the cloud server when changing mobile terminal.

The initialization unit 33 is further used for receiving user identity information entered by user and sending the user identity information to citizen database of corresponding nation, so as to verify the identity of user. The user identity information includes real name, nationality, identification card number, date of birth of the user and so on. The initialization unit 33 sends the user identity information to citizen database of corresponding nation according to the nationality information entered by the user, so as to verify the identity of user, and the main contents, which need to be verified, includes whether the identity information is real and whether it is meeting the requirement of age. If both of the two conditions are met, the user identity information will be stored into the cloud server of manufacturers.

A verification warning unit 34, is provided for giving the user a warning that the verification is unsuccessful when the verification is unsuccessful. The initialization unit 33 needs to send the user identity information entered by user to the citizen database so as to carry out verification. When the verification is unsuccessful, the cloud server will return the mobile terminal a message that the verification is unsuccessful and the verification warning unit 34 will give the user a warning that the verification is unsuccessful.

If the verification of user identity information is successful, the initialization unit 33 will build an account on the cloud server and the identity information related to the user and user identification information will be stored in this account.

The authentication module 30 further includes following units:

An authentication control unit 37, is provided for controlling the battery to wait for use instruction from user so as to supply power to the atomizer when the authentication is successful. When the authentication is successful, the authentication control unit 37 sends an instruction that the authentication is successful to the battery and after receiving the instruction, the battery will wait for use instruction from user thereby supplying power to the atomizer. At this point, the user can smoke atomizer directly. The starting of the atomizer can be controlled by airflow sensor provided in the atomizer or controlled by switch button provided on the battery, and when using, the user needs to press the switch button for normal use.

An authentication warning unit 38, is provided for giving user a warning that the authentication is unsuccessful and controlling the battery not to supply power to the atomizer when the authentication is unsuccessful. When the authentication is unsuccessful, the authentication warning unit 38 will send an instruction that the authentication is unsuccessful to the battery and give a warning to user that the authentication is unsuccessful. On this condition, no matter the user how to operate the atomizer, the atomizer receives no power supply from the battery, thus the atomizer cannot work. The warning given to user that the authentication is unsuccessful can be achieved in many ways, such as by sending an instruction to make the battery twinkle, providing pop-up dialogs on the mobile terminal and making the screen blink and so on.

The authentication information is biometric identification information or character password information, the user identification information having the same type as the authentication information. The biometric identification information includes fingerprint recognition information, face recognition information, pupil recognition information, and voice recognition information and so on.

In this embodiment, the authentication information is entered by user via mobile terminal, and in other embodiments, an input device can be provided to connect with the mobile terminal, by which the user can input authentication information, thereby achieving another way of authentication which cannot be achieved by the mobile terminal.

The control device further includes an information storage module 40, which is provided for collecting the information of frequency of use, duration of use, power, time, date, resistance value of heating wire and taste of the atomizer, all of which are taken as use information of the atomizer, after the authentication is successful, and then sending the use information of atomizer in real time to the mobile terminal to be stored therein and sending it to the cloud server as a backup via wireless module, simultaneously.

The user may have different needs at different times, for example, when at home where some juveniles are, the electronic atomization device needs to be set at a state that authentication process is needed every time the user uses it, and when on a business trip or other condition that no juveniles are, in order to use the electronic atomization device conveniently, the user prefers to make it work at a state that there is no need to carry out an authentication process every time the user uses it. Thus, in other embodiments, a switching module, by means of which user can choose whether carry out an authentication every time the user uses the electronic atomization device, can be added in the authentication device. After initializing the electronic atomization device, if corresponding user identification information can be found, the switching module will control the electronic atomization device to be capable of being used directly or call the authentication module to carry out an authentication according to the setting of user.

The Second Embodiment

Figure 2:
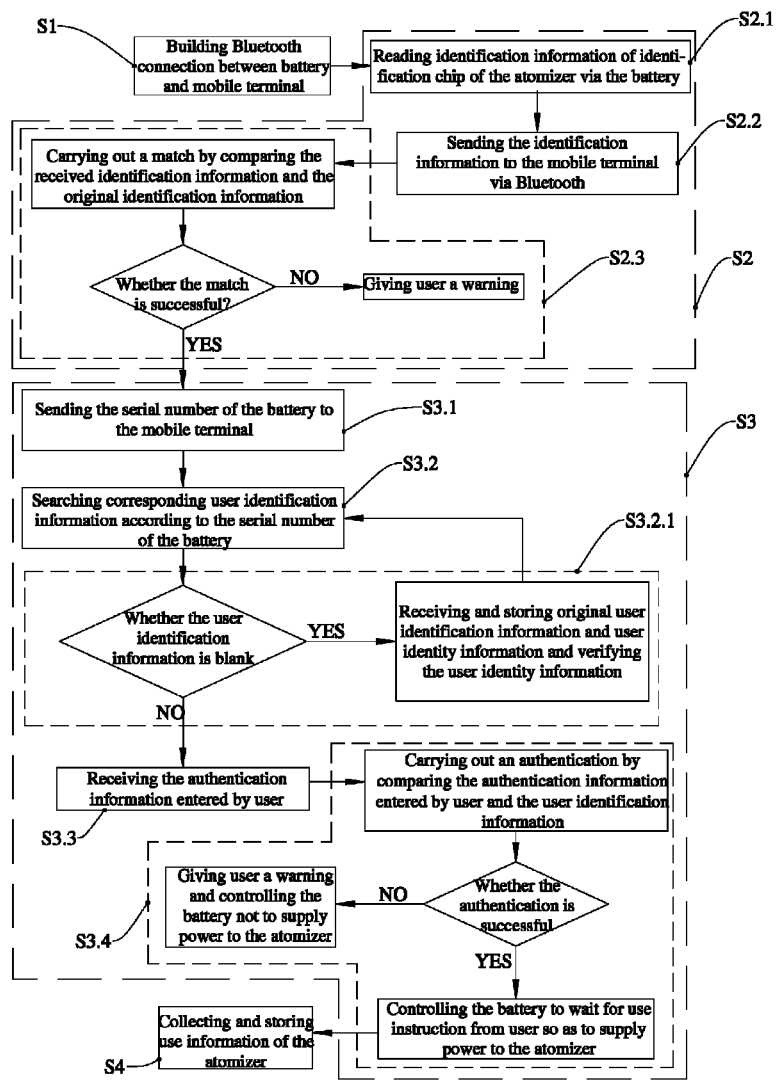
FIG. 2 is a flow chart of a control method according to the present invention.

The control method for electronic atomization device based on mobile terminal, of which a flowchart diagram is shown in FIG. 2, includes following steps:

Step S1: building a Bluetooth connection between battery and mobile terminal; the step S1 including steps of opening Bluetooth of the mobile terminal and then searching Bluetooth signal of the battery and trying to connect with the battery;

Step S2: sending atomizer identification information stored in atomizer to the mobile terminal and then carrying out a match by comparing the atomizer identification information and original identification information; and Step S3: searching corresponding user identification information according to serial number of the battery and then carrying out an authentication by comparing the authentication information entered by user and the user identification information which has been found.

Step S4: collecting and storing use information of the atomizer, the step S4 including a step of storing use information of the atomizer into the mobile terminal and cloud server simultaneously. The use information of the atomizer includes frequency of use, duration of use, power, time, date, resistance value of heating wire, taste of the atomizer and so on.

The step S2 specifically includes following steps:

Step S2.1: reading identification information of identification chip of the atomizer via the battery; the identification chip is provided within the atomizer when the atomizer is delivered and the identification chip can be a common ID chip. The identification chip of each atomizer has a serial number, which is uniquely corresponding to one atomizer, thus, such a serial number is the identification information of the identification chip. In other embodiments, the identification chip can be replaced by a memory chip and a unique serial number is written into the memory chip; and the memory chip can be a re-writable memory chip and also can be a write-once memory chip.

Step S2.2: sending the identification information to the mobile terminal via Bluetooth; specifically, after the battery reading the identification information successfully, the battery sends the identification information to the mobile terminal via Bluetooth.

Step S2.3: carrying out a match by comparing the identification information that has been received and original identification information. After receiving the identification information, the mobile terminal carries out a match by comparing the atomizer identification information and original identification information with the purpose of testing whether the atomizer is an original factory product. The step S2.3 includes steps of: firstly carrying out a match by comparing the identification information and the original identification information stored in memory of the mobile terminal, if the match is unsuccessful, carrying out a match by comparing the identification information and the original identification information stored in cloud server. Such order of matching can accelerate the matching progress.

Concretely, the step S2.3 includes a step of: giving user a warning that the match is unsuccessful when failing to match. If failing to match, give a warning to user that the match is unsuccessful and send an instruction of match failure to the battery, and the battery will not supply power to the atomizer after receiving the instruction of match failure. On this condition, no matter the user how to operate the atomizer, the atomizer receives no power supply from the battery, thus the atomizer can not work. The warning given to user that the authentication is unsuccessful can be achieved in many ways, such as by sending an instruction to make the battery twinkle, providing pop-up dialogs on the mobile terminal and making the screen blink and so on.

The step S3 includes following steps:

Step S3.1: sending the serial number of the battery to the mobile terminal. The serial number of battery is a serial number of Bluetooth chip itself, which is uniquely corresponding to this Bluetooth chip, thus it also uniquely corresponds to this battery.

Step S3.2: searching corresponding user identification information according to the serial number of the battery. In order to save cost, the user identification information is stored in the mobile terminal or cloud server instead of the battery. The user identification information is bound with the serial number of battery and stored both in the mobile terminal and the cloud server. After the mobile terminal receives the serial number from the battery, begin to search corresponding user identification information in the mobile terminal. If no user identification information can be found in the mobile terminal, try to search it in the cloud server; and if no corresponding user identification information can be found in either the mobile terminal or the cloud server, it means that the user identification information is blank.

Step S3.3: the mobile terminal receiving the authentication information entered by user. The authentication information is biometric identification information or character password information, the user identification information having the same type as the authentication information. The biometric identification information includes fingerprint recognition information, face recognition information, pupil recognition information, and voice recognition information and so on.

Step S3.4: carrying out an authentication by comparing the authentication information entered by user and the user identification information. After the authentication information being entered by user, compare the authentication information and the user identification information from the battery, and if they are the same, it means that the operation of authentication is successful.

Concretely, between the step S3.2 and step S3.3 there is further provided a following step:

Step S3.2.1: receiving and storing original user identification information when no user identification information has been stored and then returning to the step S3.2. After the mobile terminal searches user identification information, confirm whether the user identification information corresponding to the serial number of battery is blank, if it is blank, it means that the electronic atomization device is used for the first time, thus, the user needs to enter initial user identification information. After the initial user identification information being entered by user, the initialization unit will store the initial user identification information into the mobile terminal and make it be bound with the serial number of battery so as to facilitate next searching.

The step S3.2.1 further includes a step of: sending the original user identification information to cloud server as a backup. After initial user identification information being entered by user via mobile terminal, the initial user identification information will be sent to cloud server as a backup via wireless module of mobile terminal, thus, the user can directly find the initial user identification information in the cloud server when changing mobile terminal.

The step S3.2.1 further includes a step of: receiving user identity information entered by user and sending the user identity information to citizen database of corresponding nation, so as to verify the identity of user. The user identity information includes real name, nationality, identification card number, date of birth of the user and so on. Send the user identity information to citizen database of corresponding nation according to the nationality information entered by the user, so as to verify the identity of user, and the main contents, which need to be verified, includes whether the identity information is real and whether it is meeting the requirement of age. If both of the two conditions are met, the user identity information will be stored into the cloud server of manufacturers.

In the step S3.2.1, if the verification is unsuccessful, a warning that the verification is unsuccessful will be given to the user. When the verification is unsuccessful, the cloud server will return the mobile terminal a message that the verification is unsuccessful and a warning that the verification is unsuccessful will be provided to the user.

In the step S3.2.1, if the verification of user identity information is successful, an account will be built on the cloud server and the identity information related to the user and user identification information will be stored in this account.

The step S3.4 further includes a step of: controlling the battery to wait for use instruction from user so as to supply power to the atomizer when the authentication is successful. When the authentication is successful, send an instruction that the authentication is successful to the battery, and after receiving the instruction, the battery will wait for use instruction from user thereby supplying power to the atomizer. At this point, the user can smoke atomizer directly. The starting of atomizer can be controlled by airflow sensor provided in the atomizer or controlled by switch button provided on the battery, and when using, the user needs to press the switch button for normal use.

The step S3.4 further includes a step of: giving user a warning that the authentication is unsuccessful and controlling the battery not to supply power to the atomizer when the authentication is unsuccessful. When the authentication is unsuccessful, send an instruction that the authentication is unsuccessful to the battery and giving a warning to user that the authentication is unsuccessful. On this condition, no matter the user how to operate the atomizer, the atomizer receives no power supply from the battery, thus the atomizer can not work. The warning given to user that the authentication is unsuccessful can be achieved in many ways, such as by sending an instruction to make the battery twinkle, providing pop-up dialogs on the mobile terminal and making the screen blink and so on. If the authentication is unsuccessful, user is prompted to enter authentication information again and then return to step S3.3, furthermore, it can impose the maximum times incorrect authentication information can be entered.

The user may have different needs at different times, for example, when at home where some juveniles are, the electronic atomization device needs to be set at a state that authentication process is needed every time the user uses it, and when on a business trip or other condition that no juveniles are, in order to use the electronic atomization device conveniently, the user prefers to make it work at a state that there is no need to carry out an authentication process every time the user uses it. Thus, in other embodiments, a step of switching, by means of which user can choose whether carry out an authentication every time the user uses the electronic atomization device, can be added in the authentication method. After initializing the electronic atomization device (entering initial user identification information and verifying identity information of user) and after searching the user identification information, if the user identification information is not blank, by means of the step of switching, the electronic atomization device will be controlled to be capable of being used directly or the step of comparing and authenticating (step S3.3 and step S3.4) will be called to carry out an authentication according to the setting of user.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A control device for an electronic atomization device based on a mobile terminal, comprising:
    a Bluetooth control module, provided for building a Bluetooth connection between a battery and the mobile terminal;
    a matching module, provided for sending an atomizer identification information stored in an atomizer to the mobile terminal and then carrying out a match by comparing the atomizer identification information and an original atomizer identification information; and
    an authentication module, provided for searching a corresponding user identification information according to a serial number of the battery, receiving an authentication information entered by a user and then carrying out an authentication by comparing the authentication information entered by the user and the user identification information;
    wherein the authentication module comprises a switching module, the user chooses whether to carry out the authentication every time the user uses the electronic atomization device by the switching module; the switching module controls the electronic atomization device to be capable of being used directly or calls the authentication module to carry out the authentication according to the choose of the user;
    wherein said authentication module comprises an authentication control unit, which is provided for controlling the battery to wait for a use instruction from the user so as to supply a power to the atomizer when the authentication is successful; starting of the atomizer is controlled by an airflow sensor provided in the atomizer.

2. The control device according to claim 1, wherein said matching module comprises following units:
    an information reading unit, provided for controlling the battery to read the atomizer identification information of an identification chip of the atomizer;
    an information transmission unit, provided for sending the atomizer identification information to the mobile terminal via Bluetooth; and
    a comparing and matching unit, provided for carrying out the match by comparing the atomizer identification information and the original atomizer identification information.

3. The control device according to claim 2, wherein said matching module further comprises:
    a match warning unit, provided for giving the user a warning that the match is unsuccessful when failing to match.

4. The control device according to claim 2, wherein said comparing and matching unit is provided for firstly carrying out a first match by comparing the atomizer identification information and the original atomizer identification information stored in a memory of the mobile terminal, and then carrying out a second match by comparing the atomizer identification information and the original atomizer identification information stored in a cloud server if the first match is unsuccessful.

5. The control device according to claim 1, wherein said authentication module comprises following units:
    an information transmission unit, provided for sending the serial number of the battery to the mobile terminal after the atomizer connects with the battery successfully;
    an information searching unit, provided for searching the corresponding user identification information according to the serial number of the battery;
    an information input unit, provided for receiving the authentication information entered by the user; the authentication information is entered by the user via an input device provided to connect with the mobile terminal; and
    a comparing and authenticating unit, provided for carrying out the authentication by comparing the authentication information entered by the user and the user identification information.

6. The control device according to claim 5, wherein said authentication module further comprises:
    an initialization unit, provided for receiving and storing an original user identification information when the user identification information is blank.

7. The control device according to claim 6, wherein said initialization unit is further used for sending the original user identification information to a cloud server as a backup.

8. The control device according to claim 6, wherein said initialization unit is further used for receiving a user identity information entered by the user and sending the user identity information to a citizen database of a corresponding nation, so as to verify the identity of the user.

9. The control device according to claim 5, wherein said authentication module further comprises an authentication warning unit, which is provided for giving the user a warning that the authentication is unsuccessful and controlling the battery not to supply a power to the atomizer when the authentication is unsuccessful.

10. The control device according to claim 1, wherein said authentication information is a biometric identification information or a character password information, the user identification information having the same type as the authentication information.

11. The control device according to claim 1, wherein the device further comprises an information storage module, which is provided for collecting and storing a use information of the atomizer after the authentication is successful.

12. The control device according to claim 11, wherein the use information of the atomizer is simultaneously stored into the mobile terminal and a cloud server by said information storage module.

13. A control method for an electronic atomization device based on a mobile terminal, comprising following steps:
    S1: building a Bluetooth connection between a battery and the mobile terminal;
    S2: sending an atomizer identification information stored in an atomizer to the mobile terminal and then carrying out a match by comparing the atomizer identification information and an original atomizer identification information; and
    S3: searching a corresponding user identification information according to a serial number of the battery, receiving an authentication information entered by a user and then carrying out an authentication by comparing the authentication information entered by the user and the user identification information;
    the method further comprising:
    switching to chooses whether to carry out the authentication every time the user uses the electronic atomization device by the user; and controlling the electronic atomization device to be capable of being used directly or calling the step S3 to carry out the authentication according to the choose of the user;
    controlling the battery to wait for a use instruction from the user so as to supply a power to the atomizer when the authentication is successful; and
    providing an airflow sensor in the atomizer to control starting of the atomizer.

14. The control method according to claim 13, wherein the step S2 comprises following steps:
    S2.1: reading the atomizer identification information of an identification chip of the atomizer via the battery;
    S2.2: sending the atomizer identification information to the mobile terminal via Bluetooth; and
    S2.3: carrying out the match by comparing the atomizer identification information and the original atomizer identification information.

15. The control method according to claim 14, wherein the step S2.3 comprises a step of giving the user a warning that the match is unsuccessful when failing to match.

16. The control method according to claim 14, wherein the step S2.3 comprises steps of: firstly carrying out a first match by comparing the atomizer identification information and the original atomizer identification information stored in a memory of the mobile terminal, if the first match is unsuccessful, carrying out a second match by comparing the atomizer identification information and the original atomizer identification information stored in a cloud server.

17. The control method according to claim 13, wherein the step S3 comprises following steps:
    S3.1: sending the serial number of the battery to the mobile terminal;
    S3.2: searching the corresponding user identification information according to the serial number of the battery;
    S3.3: the mobile terminal receiving the authentication information entered by the user; and
    S3.4: carrying out the authentication by comparing the authentication information entered by the user and the user identification information.

18. The control method according to claim 17, wherein between the step S3.2 and step S3.3 there is further provided a following step:
    S3.2.1: receiving and storing an original user identification information when the user identification information is blank and then returning to the step S3.2.

19. The control method according to claim 18, wherein the step S3.2.1 comprises a step of: sending the original user identification information to a cloud server as a backup.

20. The control method according to claim 18, wherein the step S3.2.1 comprises a step of: receiving a user identity information entered by the user and sending the user identity information to a citizen database of a corresponding nation, so as to verify the identity of the user.

21. The control method according to claim 17, wherein the step S3.4 comprises a step of: giving the user a warning that the authentication is unsuccessful and controlling the battery not to supply a power to the atomizer when the authentication is unsuccessful.

22. The control method according to claim 13, wherein said authentication information is a biometric identification information or a character password information, the user identification information having the same type as the authentication information.

23. The control method according to claim 13, wherein there is further provided a following step after step S3:
    S4: collecting and storing a use information of the atomizer.

24. The control method according to claim 23, wherein the step S4 comprises a step of: storing the use information of the atomizer into the mobile terminal and a cloud server simultaneously.

* * * * *